UNITED STATES PATENT OFFICE.

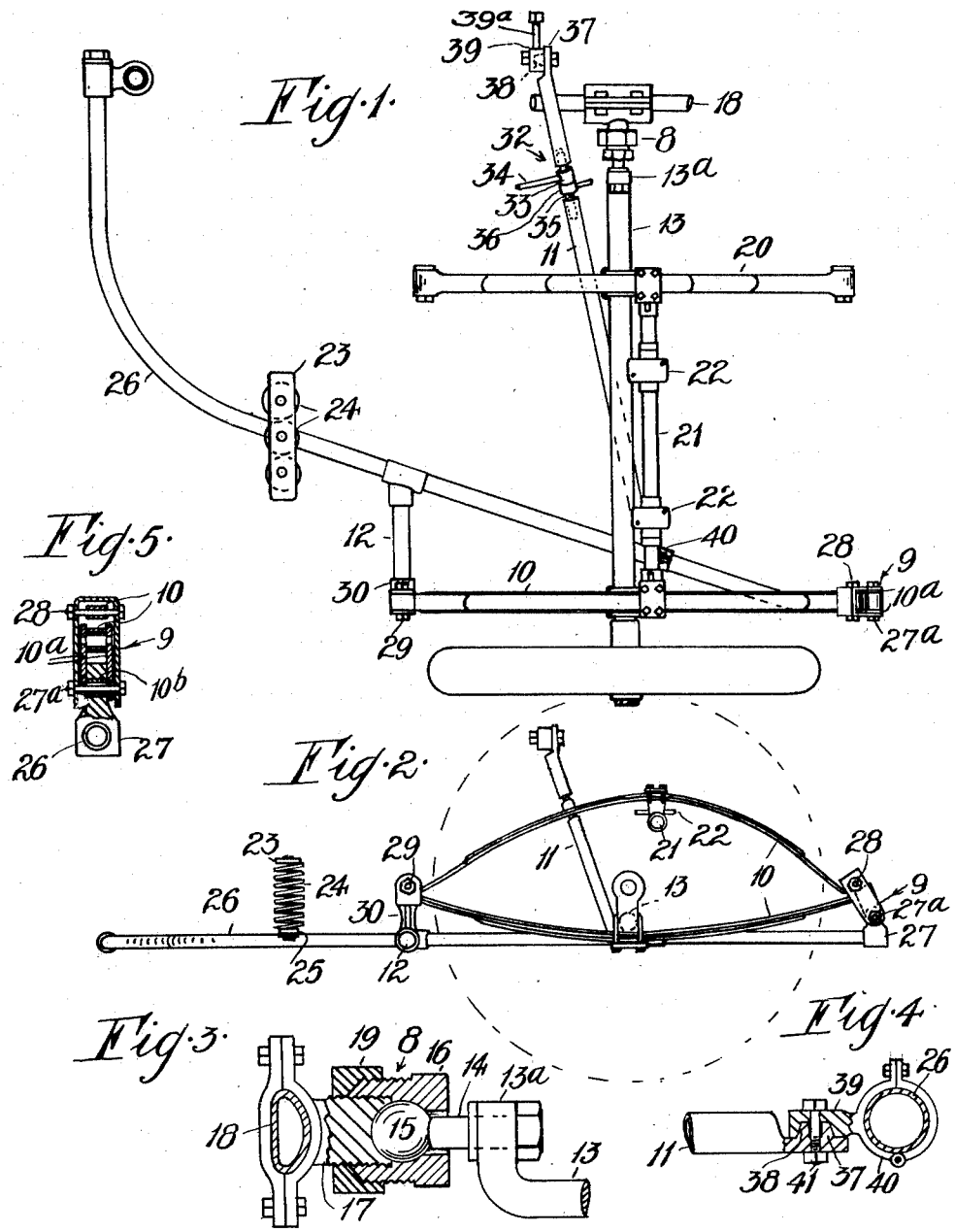

JAMES GOULDING, OF RICHMOND, VICTORIA, AUSTRALIA.

SIDE-CAR ATTACHMENT TO MOTOR-DRIVEN CYCLES.

1,372,418.   Specification of Letters Patent.   Patented Mar. 22, 1921.

Application filed January 5, 1920. Serial No. 349,564.

*To all whom it may concern:*

Be it known that I, JAMES GOULDING, a subject of the King of Great Britain, and resident of Richmond, in the State of Victoria, Australia, have invented certain new and useful Improvements Relating to Side-Car Attachments to Motor-Driven Cycles, of which the following is a specification.

The present invention refers to side car attachments to motor cycles and relates particularly to structural improvements in chassis incorporating axle attachment and spring suspension construction in which the inner end of the axle of the side car wheel or the bar carrying same is articularly coupled to the frame of the motor cycle and its outer end attached to a resilient element upon which the body of the side car is mounted.

According to these improvements the pivotal attachment of the inner end of the axle of the side car wheel to the frame of the motor cycle is effected by means of a ball joint. The inner set of elliptical springs supporting the inner side of the car body is directly mounted on said axle and the rear end of the outer set of elliptical springs supporting the outer side of the body is shackled to the rear end of a bar (hereinafter referred to as the forward bar) which passes under the axle and is rigidly attached to the motor cycle frame at a point ahead of the engine crank case. A cross arm passes from the said forward bar parallel to the axle and to its outer end is rigidly attached the front end of the elliptical spring positioned at the outer side of the body.

A third point of connection is provided by a bar attached near the rear end of the forward bar mentioned and passing under the axle is bent upwardly for connection to the frame below the saddle. In this bar, preferably at a point convenient to the rider of the cycle, a right and left handed screw threaded union is interposed preferably having a lever handle attached which can be utilized in adjusting the side car relative to the cycle.

The forward end of the body is supported in the usual way by two or more vertically arranged spiral springs resting upon a plate affixed to said forward bar.

The third point of connection below the saddle as beforementioned is preferably by means of a thimble attached to the end of the bar the eye piece of the thimble having a conical frustrum projection on one face registering in a dished seating on a lug securely clamped or otherwise attached to the cycle frame.

The eye and lug are secured together by a through bolt, which when tightened up prevents rattling on account of the seating of the conical projection mentioned.

The accompanying drawings depict a practical application of side car chassis construction according to this invention, the improved assembly comprising the ball joint at 8, shackle attachment at 9 of the rear ends of the outer elliptical set of springs 10, the longitudinally adjustable bar 11 and the bar 12 having its outer end supporting the forward ends of the said springs 10.

Figure 1 is a plan view of the chassis.

Fig. 2 a side elevation of the outer side of the chassis.

Fig. 3 an enlarged section of the ball joint attachment.

Fig. 4 an enlarged section of the attachment used at the ends of the longitudinally adjustable bar.

Fig. 5 a longitudinal section of the shackle attachment of the rear ends of the outer set of elliptical springs.

The axle bar 13 has a terminal upstanding eye 13$^a$ through which is passed the bolt 14 the end of which has integral therewith a coupling ball 15 secured in position by cupped nut 16 threaded on stub piece 17 clamped to horizontal bottom fork frame member 18 of the cycle as shown in Fig. 3. This stub piece 17 has a seating at its outer end for the ball coupling 15 and the nut 16 is locked in position by cavity nut 19. The seating furnished by stub piece 17 and nut 16 is so designed as to support while permitting articulation of the ball coupling 15.

The two sets of elliptical springs 10 and 20 are rigidly mounted on the axle bar 13 and the top members bridged by the body supporting bar 21 having pivotal plate attachments 22 to which the body is bolted. The car body (not shown) is supported at its forward end in the usual way upon a plate 23 supported by helical springs 24 mounted on a plate 25 welded or otherwise solidly held to the chassis forward bar 26. This bar 26 passes under axle bar 13 to the rear of the chassis where it terminates in an eye 27 upon which is pivotally attached by bolt 27$^a$ the inverted U-shaped shackle 9 to the upper through bolt 28 of which the rear end of the upper member of the elliptical set of springs 10 is held. The lower stiffer member of the outer set of elliptical springs 10 is riveted between shackle plates 10ᵃ (see Fig. 5) and said plates are riveted on hollow tube 10ᵇ pivotally mounted on bolt 27ᵃ. The forward ends of said springs 10 are attached to a bolt 29 in the head of upstanding bracket 30 rigidly mounted on short arm 12 rigidly held to the forward bar 26 and which arm lies parallel to axle bar 13.

The chassis construction is arranged to effect a three point attachment to a motor cycle by the ball joint 8, forward end of bar 26, the latter ahead of the engine crank case, and the bar 11. This bar 11 is clamped at its lower end to the rearward portion of bar 26, its lower end having a terminal thimble 37 with a coned face 38 (see Fig. 4) to seat within a cavity in the projection 39 of clamp 40 said faces being held together by through bolt 41. The clamp 40 may be adjusted along the bar 26 thereby raising or lowering said bar 26 and amplifying the adjustment at a coupling 32. This bar 11 proceeds under the axle bar 13 thence by an upward set through the inner set of springs 20 for attachment to the cycle frame at the saddle stem position Fig. 1. For this purpose the member 39 is provided with a bolt 39ᵃ for passing through what is termed the saddle post cluster and is secured therein by a nut on the end of the bolt. Intermediate of its ends a union coupling 32 is interposed and consists of a collar 33 having rod handle 34 and secured to the right and left handed screw threaded rod 35 the oppositely threaded ends of which engage in correspondingly threaded apertures in said bar 11. A collar 36 is provided for locking the collar 33.

The construction shown while materially improving the chassis stability retains all the known advantages of the articulated axle bar operating under rock shocks from the side car wheel against the sets of springs 10 and 20. It will be observed that the body supporting bar 21 lies in a plane to the rear of the plane of the axle bar 13 and this arrangement is preferred and tends to prevent any nose dip by the body of the side car and throw most of the weight on the main springs 10 and 20.

My side car chassis is of exceptionally easy riding, very easily constructed and quickly attached to and detached from the cycle frame. I attribute the advantages to the three-point connection with the cycle frame, the freedom of movement of the axle with respect to the chassis, the suspension of the forward bar from the axle by the outside spring only, and the adjustability of the rod 11 along the forward rod, these two rods forming an acute angle. As already pointed out, the body bar 21 is arranged to the rear of the wheel axle 13, tending to keep the nose of the side car body from drooping.

I claim:—

1. In a motor cycle side car chassis construction, a wheel axle having movable connection with the motor cycle, a forward bar for connection at its front end to the cycle frame, a bar connected to said forward bar for connection to the cycle near the saddle, and a spring connecting the axle to the forward bar, thereby forming a three point connection with the cycle.

2. In motor cycle side car chassis construction, in combination, an axle bar articularly connected to the motor cycle frame, parallel pairs of elliptical springs mounted on said axle, a forward bar to which the rear ends of the outer set of elliptical springs are shackled, said bar being attachable to a forward point on the motor cycle frame, means on said bar for the attachment of the forward end of the body and an outwardly projecting arm from said forward bar supporting the forward ends of the outer set of elliptical springs.

3. In motor cycle side car chassis construction, in combination, an axle bar articularly connected to the motor cycle frame, parallel pairs of elliptical springs mounted on said axle, a forward bar to which the rear ends of the outer set of elliptical springs are shackled, said bar constituting a forward point of attachment of the chassis to the motor cycle frame, means on said bar for the attachment of the forward end of the body, an outwardly projecting arm from said forward bar supporting the forward ends of the outer set of elliptical springs, and a bar connected to said forward bar and to the cycle frame at the saddle stem position and having intermediate of its ends a union coupling.

4. In a motor cycle side car chassis construction, a wheel axle having a movable connection with the motor cycle, a forward bar for connection at its front end to the cycle frame, a bar for connection to the cycle near the saddle and adjustably connected to said forward bar, and a spring connecting the axle and forward bar.

5. In motor cycle side car chassis, two rearward points of attachment to the cycle frame, one by means of a ball joint connection of the axle bar, and the other at the saddle stem position by a conical faced frustrum connection adapted to be held to the cycle frame, the bar proceeding from said connection having a right and left handed screwed union coupling interposed intermediate of its length.

6. In a motor cycle side car chassis construction, a wheel axle having a pivotal connection with the motor cycle, a forward bar connected at its front end to the cycle and having its rear portion at an inclination to the axle, a spring between the axle and forward bar, an offset from said inclined portion of the forward bar and a post on said offset to which the end of the spring members are connected, and shackles connecting the rear ends of said spring members to the forward bar at a point to the rear of said axle.

7. In a motor cycle side car chassis construction, a forward bar, a bar adjustably connected thereto at one end and adjustably connected with the cycle frame near the saddle, said bars making an acute angle with one another, whereby when said second bar is adjusted along the forward bar the inclination of the motor cycle may be adjusted.

8. In a motor cycle side car chassis construction, a forward bar, an axle for pivotal connection at one end to the cycle frame, and rear body springs mounted on the axle, one of said springs connecting the axle with the forward bar.

9. In a motor cycle side car chassis construction, a wheel axle having a pivot at its end for connection to the cycle frame, two body springs mounted on said axle, a body supporting bar connected to said springs, said bar arranged in a plane to the rear of said axle.

10. In a motor cycle side car chassis construction, a wheel axle having pivotal connection at one end to the cycle frame, a pair of elliptic springs connected to said axle, a body supporting bar connected to the upper member of said springs and arranged to the rear of said axle, and a forward bar suspended from both ends of the outer spring and connected at its front end to the cycle frame.

11. In a motor cycle side car chassis, a wheel axle for pivotal connection to a cycle frame, a body spring secured to said axle adjacent the pivotal end of said axle, a semi-elliptic spring secured to said axle adjacent the wheel end thereof, a chassis frame suspended from the ends of said spring and having a forward bar and a second bar for connection to the cycle frame and a semi-elliptic body spring coöperating with the latter spring and having a stationary point of connection with said frame, and a shackle connection at its other end with said frame.

12. In a motor cycle side car chassis, an axle for pivotal connection with a cycle frame, a chassis frame suspended from a semi-elliptic spring on the wheel end of said axle, said spring having a stationary point of connection at one end with said frame, a shackle connecting the other end with said frame, a semi-elliptic body spring connected at one end to said frame at said point, and a shackle connecting the opposite end of said spring to said frame, both said shackles having a pivot common thereto.

Dated this 24th day of November, A. D. 1919.

JAMES GOULDING.